Oct. 29, 1957  R. R. LEECH  2,811,222
APPARATUS AND PROCESS FOR COLLECTING FINE PARTICLES
Filed Feb. 27, 1956  2 Sheets-Sheet 1

INVENTOR.
ROBERT R. LEECH
BY
Arthur H. Seidel
ATTORNEY

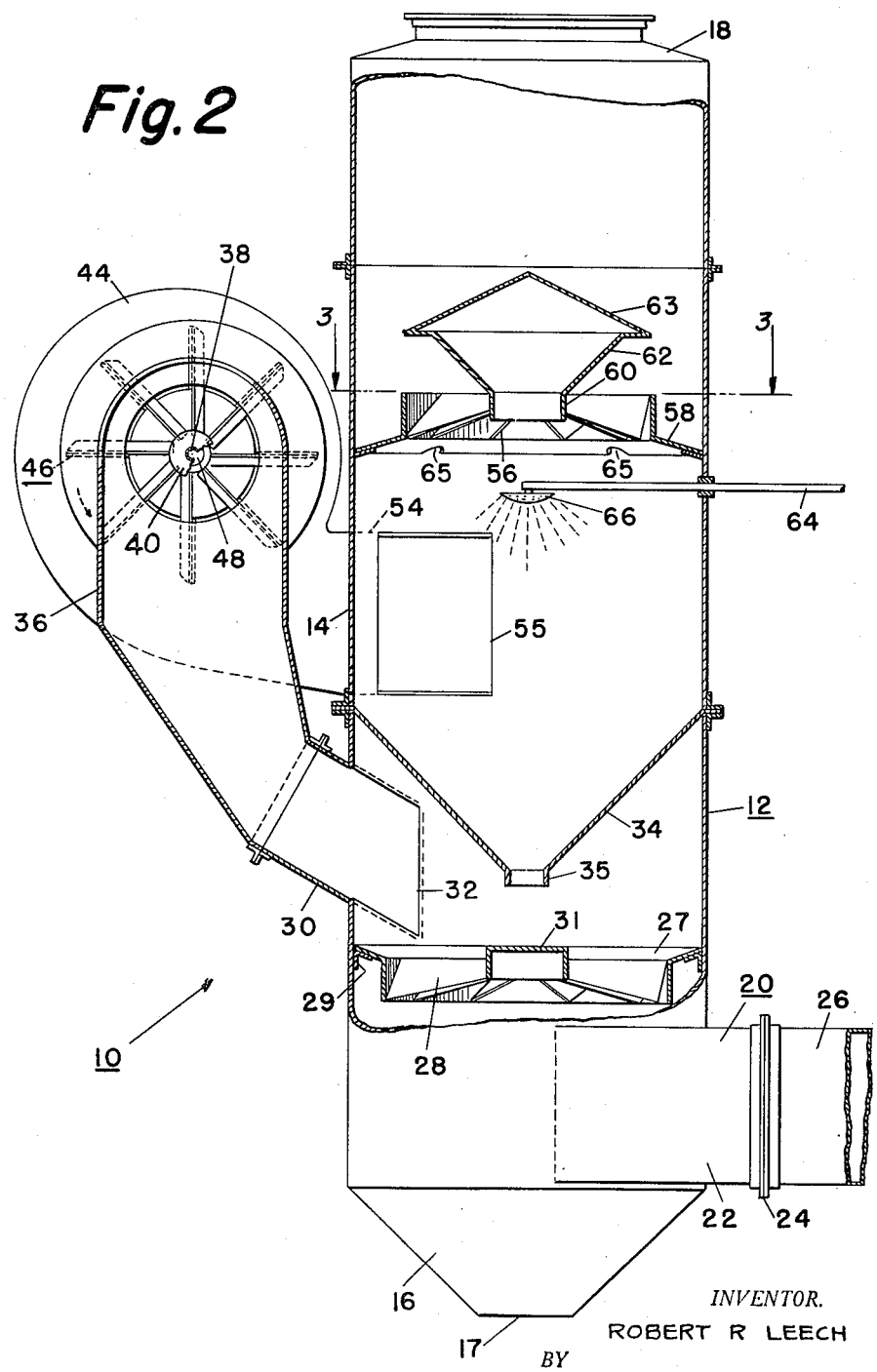

United States Patent Office 2,811,222
Patented Oct. 29, 1957

2,811,222

APPARATUS AND PROCESS FOR COLLECTING FINE PARTICLES

Robert R. Leech, Merrick, N. Y., assignor to The Ducon Company, Mineola, N. Y., a partnership Application February 27, 1956, Serial No. 567,868

19 Claims. (Cl. 183—25)

The present invention relates to a device for removing fine particles from a gas medium and more particularly to a centrifugal gas washer and dust collector capable of effecting dust removal with an efficiency of over 99 percent by weight, and utilizing a minimal amount of wash water.

Modern industrial development has led to serious air pollution problems. These problems frequently arise from the discharge of dust such as dust comprising carbon black, limestone, soapstone, pigments, glazing dusts, or other dust derived from chemical and mineral sources into the atmosphere. Concern as to the injurious effect of such dusts upon human, animal and plant life, has led to anti-dust legislation in many communities. The provision of dust collectors capable of effecting quantitative removal of dust particles from gas streams discharged into the atmosphere has therefore assumed major industrial significance.

While dust collectors capable of removing dust and fines at an efficiency of the order of 80 or 90 percent by weight have heretofore been deemed satisfactory, the large scale growth of industry within recent years, and the absolute necessity for curbing the discharge of dusts into the atmosphere requires that dust collectors having an efficiency approximating the absolute be employed. In particular, dust collectors having operating efficiencies of in excess of 99 percent by weight are absolutely essential in the case of many dusts which are highly injurious to life.

Not only are highly efficient dust collectors desirable for preventing contamination of the atmosphere, but in many cases it is desirable to reclaim valuable fines which are otherwise lost to the atmosphere unless they can be collected. This is frequently the case in the recovery of dusts from chemical processing plants involving valuable or expensive chemical materials, such as pharmaceuticals. However, even in the manufacture of wallboard and like substances, the recovery of trim dust and scrap, which may be returned to process may result in important savings and a considerable increase in processing efficiency.

The present invention has as an object the provision of a dust collector having a very high collecting efficiency.

Another object of the present invention is the provision of a dust collector in which wear due to abrasion and erosion is minimized.

This invention has as yet another object the provision of a dust collector in which cleaning of the component elements thereof is accomplished during the operation of the dust collector, and shutdown to effect cleaning of the component elements of the dust collector are obviated.

This invention has as a still further object the provision of a dust collector utilizing minimal amounts of wash water.

The present invention has as a further object the provision of a dust collector in which fire or explosion hazards are eliminated.

Another object of the present invention is the provision of a highly efficient process for effecting dust collection.

A still different object of the present invention is the provision of a process for effecting recovery of dust particles from a dust laden gas stream in the form of a solution or slurry, which may be used as the feed for spray drying, rotary drying and like processes.

These and other objects are accomplished by the dust collector of the present invention in which the dust collector includes a precleaning stage, an intermediary prime mover stage and a final separator stage. The stages are interconnected, and wash water which is circulated through all three stages is introduced into the dust collector in the dynamic separation and prime mover stage and in the final separator stage.

By agglomerating the dust particles, and by conditioning them, in a humid atmosphere, the operation of the dynamic separation and prime mover stage is rendered greatly more efficient in separating the finer particles. Furthermore, by removing the coarser particles prior to contact with the fan or other dynamic separator and prime mover, abrasion or erosion of the fan is greatly reduced.

I have found that changes in the direction of gas flow between the separate stages aids in effecting maximum dust collection and removal. Furthermore, the washing action in the dynamic separation and prime mover stage prevents agglomeration and build-up of dust particles upon the surfaces of the prime mover and clogging of the dust collector.

The process of my invention comprises removing dust particles from a dust-laden stream of gas through simultaneously exposing such dust particles to centrifugal action, mechanical action, and to the washing action of a liquid. The direction of the gas stream is then radically modified, and the stream exposed to the washing action of a washing liquid which has not previously contacted said stream in the dynamic separation and prime mover stage where the direction of the stream is then again radically changed, its velocity greatly increased, and the solid particles contained therein subjected to severe mechanical action. This results in further agglomeration of the particles within the stream and their impingement on wetted surfaces effecting the stream. The gas stream is then further contacted with additional liquid which has not previously been in contact with the solids content of the stream, and substantially quantitative removal of the solids from the stream is effected by combined washing and centrifugal action. The added wash water plus a minor portion of the gas stream is then recycled to contact the untreated dust laden stream.

The apparatus and process of my invention takes maximum advantage of the detergent affect obtained by the lowering of the surface tension of the water from the dynamic separation and prime mover, and final separator stages due to the presence therein of suspended emulsified or partially dissolved or soluble dust particles, when the apparatus and process of the present invention is used to remove such dust particles. The lowered surface tension of this water greatly facilitates removal of dust particles in the first or pretreatment stage.

For the purpose of illustrating the invention there is shown in the drawings a form which is presently preferred; it being understood, however, that this invention is not limited to the precise arrangements and instrumentalities shown.

Referring to the drawings wherein like reference characters refer to like parts:

Figure 2 is a longitudinal sectional view taken on line 2—2 of Figure 1.

Figure 1:
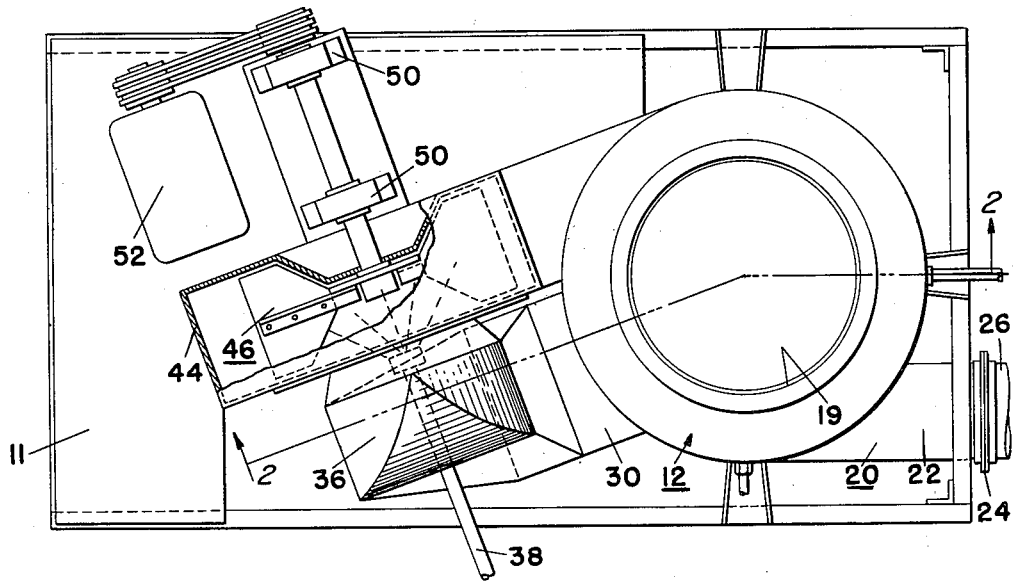
Figure 1 is a plan view of the dust collector apparatus of the present invention mounted upon a platform.
Figure 3:
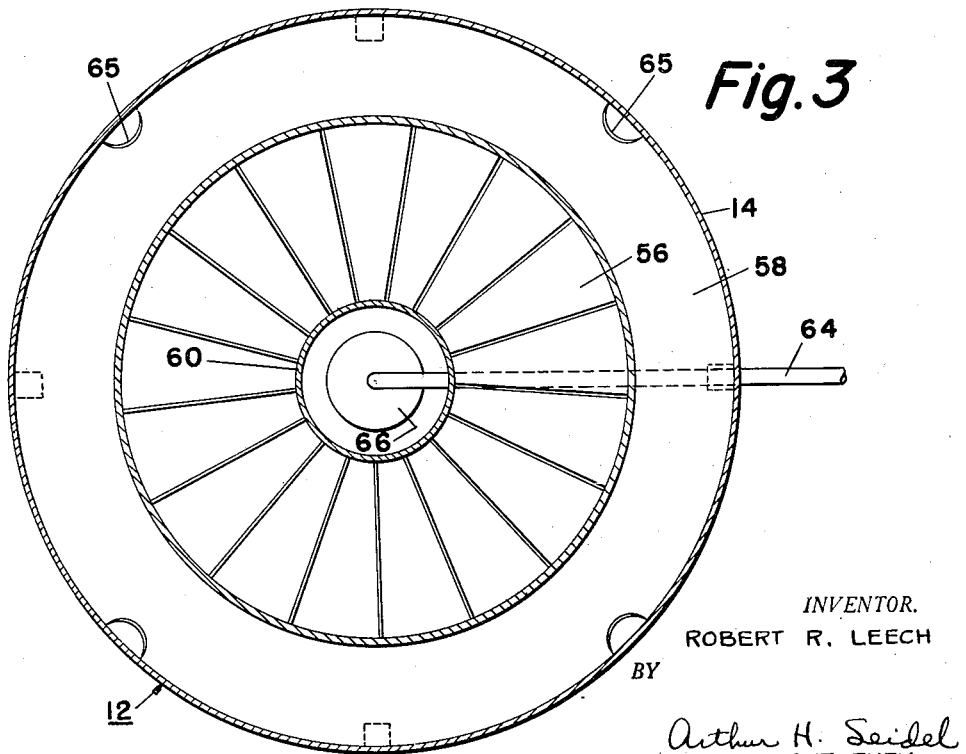
Figure 3 is a cross-sectional view taken on line 3—3 of Figure 1.

Referring to the drawings, 10 designates the dust collector apparatus of the present invention, which is mounted on platform 11 (see Figure 1). The dust collector 10 includes a generally cylindrical washer 12 in which are located the precleaning and final separator stages as will be more fully explained below. Washer 12 includes a generally cylindrical body portion or casing 14 having an inverted truncated conical sludge outlet portion 16 at its base, and a gas outlet portion 18 at its top. Sludge outlet portion 16 is provided with a discharge opening 17 at its base, and gas outlet portion 18 is provided with opening 19.

Inlet 20 at the base of body portion 14 includes inlet duct 22 and an inlet flange 24 which may be fixedly secured to duct 26 which transports dust laden air.

Positioned within body portion 14 somewhat above inlet 20 are radially arranged vanes 28, which are inclined to the vertical, and are joined at their outer extremities by annular flange 27. Annular flange 27 is carried by supporting flange 29 which is anchored to body portion 14. Vanes 28 are joined at their center portion by an inverted dish shaped hub 31 which serves to prevent the formation of a vortex and controls the screw-like motion of the rising air stream within body portion 14.

Duct 30 extends into body portion 14 with its mouth 32 positioned somewhat above vanes 28 and beneath conical funnel 34. Funnel 34 discharges through its basal opening 35 along the longitudinal axis of body portion 14.

Duct 30 extends upwardly from body portion 14 to a transition chamber 36.

Disposed behind transition chamber 36 and in gas communication therewith is fan housing 44 in which is disposed a paddle wheel fan 46. Paddle wheel fan 46 is carried on rotor shaft 48 which is supported on bearings 50 and driven by electric motor 52.

While a large variety of fans may be utilized in the apparatus of my invention, the use of a paddle wheel fan is to be preferred. Thus, paddle wheel fans are self-cleaning, and unlike backplate fans and other fan embodiments, there are no corners presenting a dead spot upon which dust particles can collect.

A washing liquid inlet 38 is provided with a spray head 40 which discharges into fan housing 44 in the plane of the paddle surfaces of paddle wheel fan 46 so that such surfaces are continuously subjected to a washing action, and build-up of solids on the surfaces is avoided.

The discharge duct 54 from fan housing 44 passes through the wall of body portion 14 between funnel 34 and moisture eliminator vanes 56, its mouth 55 entering tangentially to the wall of body portion 14. Moisture eliminator vanes 56 are radially arranged, and inclined to the vertical. Vanes 56 are attached to flange 58 at their outer extremities and to hub 60 at their inner extremities. Hub 60 carries an inverted generally frustro-conical deflector 62 whose uppermost portion consists of a conical plate 63 whose outer extremities project beyond the walls of deflector 62. Hub 60, deflector 62, and plate 63 serve to prevent the formation of a vortex and control the screw-like motion of the rising air stream within body portion 14.

A series of spaced semilunar notches 65 are provided along the outer edge of flange 58 to facilitate the downward passage of water.

A washing liquid inlet 64 provided with a spray head 66 of conventional design is positioned beneath moisture eliminator vanes 56.

The operation of dust collector 10 and the process of the present invention is as follows:

Dust laden gas, such as dust laden air, tangentially enters dust collector 10 from duct 26 through inlet 20 and passes into body portion 14. Its tangential direction of entrance causes the dust laden air to move spirally upwardly through body portion 14.

The vanes 28 are set at an angle to the longitudinal axis of washer 12 in the direction in which the rotating column of gas passes through them, so that by their inclination they tend to maintain the whirling motion of the gas column and at the same time distribute the gas around the periphery of the casing as it proceeds upwardly.

The spiralling motion of the dust laden gas effects an appreciable centrifugal force upon the dust particles carried by the gas stream. Due to the centrifugal force on such particles there is impingement on the wet inner surface of body portion 14 by such particles, as well as impingement by the particles on wetted vanes 28.

The upwardly moving gas stream contacts downwardly moving liquid being discharged through the mouth 35 of funnel shaped hopper 34. Such liquid from funnel 34 is liquid introduced through both washing liquid inlet 38 and washing liquid inlet 64, and has already been contacted with dust particles. When the dust is of the nature which reduces the surface tension of water when suspended therein, the washing liquid exerts a greater and more efficient wetting and washing action. The washing liquid from funnel 34 is likewise impelled centrifugally outwardly and upwardly on contact with the spirally moving rising gas stream and forms a film or sheet of liquid on the wall of body portion 14, and flows downwardly to form a liquid film on vanes 28 and passes into sludge outlet portion 16, from which it is removed as sludge through discharge opening 17.

The size of the opening of mouth 35 of funnel 34 controls the degree of atomization of the descending liquid in funnel 34. By restricting the size of mouth 35 the recycling of gas and washing liquid containing suspended particles therefrom to duct 30 may be reduced and controlled.

The upwardly moving gas and washing liquid pass radially from body portion 14 through mouth 32 of duct 30. This radial change of direction serves to facilitate the separation of liquid particles from the gas stream.

Passing upwardly through duct 30 the gas and particles pass into chamber 36. The mixture is then passed into fan housing 44. Within fan housing 44, separation of the particles is effected by the dynamic action of the fan 46 with the washing liquid playing across the broad fan blade surfaces preventing build-up of the dust particles thereon. From fan housing 44 the mixture of gas, particles and liquid is impelled through duct 54 into body portion 14.

The contact between the washing liquid and dust particles prior to the contact with fan 46 greatly reduces the deleterious effect of the dust particles upon fan 46, since as heretofore indicated, the larger and more abrasive particles are removed. The liquid film which traverses the fan blades materially aids in the prevention of particle build-up upon the fan. Moreover, the conditioning of the dust particles and gas with the washing liquid greatly improves the efficiency of the dynamic separating action of the fan and of the last stage within body portion 14.

The impelled gas, particle and liquid mixture from duct 54 tangentially enters body portion 14 through duct mouth 55 and is thereby imparted a spiralling motion.

Within body portion 14 final separation is effected. Thus, final cleaning occurs from the impingement of the agglomerated dust particles in the gas stream both on the wetted surfaces of body portion 14 and on the liquid spray from spray head 66. The passage of the gas upwardly through vanes 56 results in the imparting of a further spiralling motion thereto and further centrifugal action upon the entrained solid and liquid particles and agglomerates. Vanes 56 expel washing liquid entrained in the rising gas stream, such liquid being caught by vanes 56, hub 60, deflector 62 and plate 63, and is thrown outwardly to the interior wall surface of body portion 14 to be discharged through openings 65 in flange 58.

The purified gas stream, which is substantially free from liquid, is removed through clean gas outlet portion 18, and may be conveyed either to the atmosphere or to further processing equipment after passing through opening 19 of outlet portion 18.

The present invention may be embodied in other specific forms without departing from the spirit or essential attributes thereof and, accordingly, reference should be made to the appended claims, rather than to the foregoing specification as indicating the scope of the invention.

I claim:

1. Dust collector apparatus including an upright elongated generally cylindrical washer, a tangential gas inlet for dust laden gas in the bottom portion of said washer, radially extending baffle means above said gas inlet, said baffle means including a plurality of inclined vanes forming passageways for imparting rotatory motion to gas introduced through said gas inlet, a sludge outlet below said gas inlet, an open-ended circuitous duct having its entrance and exit within said washer with the major portion of said duct being without said washer, the entrance of said duct being spaced above said radially extending baffle means and the exit of said duct being spaced above the duct's entrance, dynamic separation and impelling means in said duct comprising rapidly rotating means, spraying means for introducing liquid onto the surface of said rapidly rotating means, spraying means above the entrance of said duct for introducing liquid into said washer, radially extending liquid separating means in said washer above the exit of said duct, and a clean gas outlet above said liquid separating means.

2. Dust collector apparatus including an upright elongated generally cylindrical washer, a tangential gas inlet for dust laden gas in the bottom portion of said washer, radially extending baffle means above said gas inlet, said baffle means including a plurality of inclined vanes forming passageways for imparting rotatory motion to gas introduced through said gas inlet, a sludge outlet below said gas inlet, an open-ended circuitous duct having its entrance and exit within said washer with the major portion of said duct being without said washer, the entrance of said duct being spaced above said radially extending baffle means and the exit of said duct being spaced above the duct's entrance, dynamic separation and impelling means in said duct comprising rapidly rotating means, spraying means for introducing liquid onto the surface of said rapidly rotating means, spraying means above the entrance of said duct for introducing liquid into said washer, a funnel shaped collector beneath the spraying means in said washer for inwardly directing downwardly moving liquid, radially extending liquid separating means in said washer above the exit of said duct, and a clean gas outlet above said liquid separating means.

3. Dust collector apparatus including an upright elongated generally cylindrical washer, a tangential gas inlet for dust laden gas in the bottom portion of said washer, radially extending baffle means above said gas inlet, said baffle means including a plurality of inclined vanes forming passageways for imparting rotatory motion to gas introduced through said gas inlet, a sludge outlet below said gas inlet, an open-ended circuitous duct having its entrance and exit within said washer with the major portion of said duct being without said washer, the entrance of said duct being spaced above said radially extending baffle means and the exit of said duct being spaced above the duct's entrance, dynamic separation and impelling means in said duct comprising a paddle wheel fan radially disposed in said duct, spraying means for introducing liquid onto the blades of said paddle wheel fan, spraying means above the entrance of said duct for introducing liquid into said washer, radially extending liquid separating means in said washer above the exit of said duct, and a clean gas outlet above said liquid separating means.

4. Dust collector apparatus including an upright elongated generally cylindrical washer, a tangential gas inlet for dust laden gas in the bottom portion of said washer, radially extending baffle means above said gas inlet, said baffle means including a plurality of inclined vanes forming passageways for imparting rotatory motion to gas introduced through said gas inlet, a sludge outlet below said gas inlet, an open-ended circuitous duct having its entrance and exit within said washer with the major portion of said duct being without said washer, the entrance of said duct being spaced above said radially extending baffle means and the exit of said duct being spaced above the duct's entrance, dynamic separation and impelling means in said duct comprising rapidly rotating means, spraying means for introducing liquid onto the surface of said rapidly rotating means, spraying means positioned at a spaced distance above the exit of said duct for introducing liquid into said washer, a funnel shaped collector in said washer between the entrance and the exit of said duct, the opening at the base of said collector being sufficiently restricted so that liquid passing through said collector is atomized outwardly, radially extending liquid separating means in said washer above the exit of said duct, and a clean gas outlet above said liquid separating means.

5. Dust collector apparatus including an upright elongated generally cylindrical washer, a tangential gas inlet for dust laden gas in the bottom portion of said washer, radially extending baffle means above said gas inlet, said baffle means including a plurality of inclined vanes forming passageways for imparting rotatory motion to gas introduced through said gas inlet, a sludge outlet below said gas inlet, an open-ended circuitous duct having its entrance and exit within said washer with the major portion of said duct being without said washer, the entrance of said duct being spaced above said radially extending baffle means and the exit of said duct being spaced above the duct's entrance, dynamic separation and impelling means in said duct comprising rapidly rotating means, spraying means for introducing liquid onto the surface of said rapidly rotating means, spraying means above the entrance of said duct for introducing liquid into said washer, radially extending liquid separating means in said washer above the exit of said duct, said separating means including an annular baffle extending inwardly and upwardly within said washer, said baffle having a central opening, an inverted frustroconical deflector supported within and extending downwardly into the opening of said baffle, a plurality of inclined vanes attached along their inner extremities to said deflector and extending from said point of attachment radially outward, said vanes being attached along their outer extremities to the annular baffle, said vanes forming passageways for imparting rotatory motion to gas moving upwardly therethrough, and a clean gas outlet above said liquid separating means.

6. Dust collector apparatus including an upright elongated generally cylindrical washer, a tangential gas inlet for dust laden gas in the bottom portion of said washer, radially extending baffle means above said gas inlet, said baffle means including an annular baffle extending inwardly and downwardly from the inner wall of said washer and having a central opening, a centrally positioned imperforate deflector, vanes attached along their inner extremities to said centrally positioned deflector, said vanes extending from said point of attachment radially outward and attached along their outer extremities to said annular baffle, said vanes dividing the interior of said washer into a plurality of upwardly extending passageways, said vanes being inclined to the vertical so as to receive a rotating column of dust laden gas from the tangential inlet and maintain it in rotation, a sludge outlet below said gas inlet, an open-ended circuitous duct having its entrance and exit within said washer with the major portion of said duct being without said washer, the entrance of said duct being spaced above said radially extending baffle means and the exit of said duct being spaced above the duct's entrance, dynamic separation and impelling means in said duct comprising rapidly rotating means, spraying means for introducing liquid onto the surface of said rapidly rotating means, spraying means above the entrance of said duct for introducing liquid into said washer, radially extending liquid separating means in said washer above the exit of said duct, and a clean gas outlet above said liquid separating means.

7. Dust collector apparatus including an upright elongated generally cylindrical washer, a tangential gas inlet for dust laden gas in the bottom portion of said washer, radially extending baffle means above said gas inlet, said baffle means including an annular baffle extending inwardly and downwardly from the inner wall of said washer and having a central opening, a centrally positioned imperforate deflector, vanes attached along their inner extremities to said centrally positioned deflector, said vanes extending from said point of attachment radially outward and attached along their outer extremities to said annular baffle, said vanes dividing the interior of said washer into a plurality of upwardly extending passageways, said vanes being inclined to the vertical so as to receive a rotating column of dust laden gas from the tangential inlet and maintain it in rotation, a sludge outlet below said gas inlet, an open-ended circuitous duct having its entrance and exit within said washer with the major portion of said duct being without said washer, the entrance of said duct being spaced above said radially extending baffle means and the exit of said duct being spaced above the duct's entrance, dynamic separation and impelling means in said duct comprising a paddle wheel fan radially disposed in said duct, spraying means for introducing liquid onto the blades of said paddle wheel fan, spraying means positioned at a spaced distance above the exit of said duct for introducing liquid into said washer, a funnel shaped collector in said washer between the entrance and the exit of said duct, the opening at the base of said collector being sufficiently restricted so that liquid passing through said collector is atomized outwardly, radially extending liquid separating means in said washer above the exit of said duct, said means including an annular baffle extending inwardly and upwardly within said washer, said baffle having a central opening, an inverted frustroconical deflector supported within and extending downwardly into the opening of said baffle, a plurality of inclined vanes attached along their inner extremities to said deflector and extending from said point of attachment radially outward, said vanes being attached along their outer extremities to the annular baffle, said vanes forming passageways for imparting rotatory motion to gas moving upwardly therethrough, and a clean gas outlet above said liquid separating means.

8. Dust collector apparatus including an upright elongated generally cylindrical washer, a tangential gas inlet for dust laden gas in the bottom portion of said washer, an annular baffle extending inwardly and downwardly from the inner wall of said washer and having a central opening, a centrally positioned imperforate deflector, vanes attached along their inner extremities to said centrally positioned deflector, said vanes extending from said point of attachment radially outward and attached along their outer extremities to said annular baffle, said vanes dividing the interior of said washer into a plurality of upwardly extending passageways, said vanes being inclined to the vertical so as to receive a rotating column of dust laden gas from the tangential inlet and maintain it in rotation, a sludge outlet below said gas inlet, an open-ended circuitous duct, the both ends of said duct being within said washer and positioned one above the other, with the lower open end constituting the entrance for the duct and the upper open end constituting the exit for the duct, the major portion of said duct being without said washer, the entrance of said duct being spaced above said annular baffle, dynamic separation and impelling means in said duct comprising a paddle wheel fan radially disposed in said duct, spraying means for introducing liquid onto the blades of said paddle wheel fan, spraying means in said washer positioned above the exit of the duct for discharging liquid into the washer, a funnel shaped collector in said washer between the entrance and the exit of said duct, the opening at the base of said collector being sufficiently restricted so that liquid passing through said collector is atomized outwardly, liquid separating means within said washer above the exit of said duct, said liquid separating means including an annular baffle extending inwardly and upwardly within said washer, said baffle having a central opening, an inverted frustroconical deflector supported within and extending downwardly into the opening of said baffle, a plurality of inclined vanes attached along their inner extremities to said deflector and extending from said point of attachment radially outward, said vanes being attached along their outer extremities to the annular baffle, said vanes forming passageways for imparting rotatory motion to gas moving upwardly therethrough, and a clean gas outlet above said liquid separating means.

9. Dust collector apparatus including an upright elongated generally cylindrical washer, a tangential gas inlet for dust laden gas in the bottom portion of said washer, radially extending baffle means above said gas inlet, said baffle means including a plurality of inclined vanes forming passageways for imparting rotatory motion to gas introduced through said gas inlet, a sludge outlet below said gas inlet, an open-ended circuitous duct having its entrance and exit within said washer with the major portion of said duct being without said washer, the entrance of said duct being spaced above said radially extending baffle means and the exit of said duct being spaced above the duct's entrance, dynamic separation and impelling means consisting of a paddle wheel fan in said duct, spraying means for introducing liquid onto the surface of said paddle wheel fan, spraying means above the entrance of said duct for introducing liquid into said washer, a funnel-shaped collector beneath the spraying means in said washer for inwardly directing downwardly moving liquid, radially extending liquid separating means in said washer above the exit of said duct, and a clean gas outlet above said liquid separating means.

10. Dust collector apparatus including an upright elongated generally cylindrical washer, a tangential gas inlet for dust laden gas in the bottom portion of said washer, radially extending baffle means above said gas inlet, said baffle means including a plurality of inclined vanes forming passageways for imparting rotatory motion to gas introduced through said gas inlet, a sludge outlet below said gas inlet, an open-ended circuitous duct having its entrance and exit within said washer with the major portion of said duct being without said washer, the entrance of said duct being spaced above said radially extending baffle means and the exit of said duct being spaced above the duct's entrance, dynamic separation and impelling means in said duct comprising rapidly rotating means, spraying means for introducing liquid onto the surface of said rapidly rotating means, spraying means positioned at a spaced distance above the exit of said duct for introducing liquid into said washer, a funnel-shaped collector beneath the spraying means in said washer for inwardly directing downwardly moving liquid, radially extending liquid separating means in said washer above the exit of said duct, and a clean gas outlet above said liquid separating means.

11. Dust collector apparatus including an upright elongated generally cylindrical washer, a tangential gas inlet for dust laden gas in the bottom portion of said washer, radially extending baffle means above said gas inlet, said baffle means including a plurality of inclined vanes forming passageways for imparting rotatory motion to gas introduced through said gas inlet, a sludge outlet below said gas inlet, an open-ended circuitous duct having its entrance and exit within said washer with the major portion of said duct being without said washer, the entrance of said duct being spaced above said radially extending baffle means and the exit of said duct being spaced above the duct's entrance, dynamic separation and impelling means in said duct comprising rapidly rotating means, spraying means for introducing liquid onto the surface of said rapidly rotating means, spraying means above the entrance of said duct for introducing liquid into said washer, a funnel-shaped collector beneath the spraying means in said washer for inwardly directing downwardly moving liquid, radially extending liquid separating means in said washer above the exit of said duct, said means including an annular baffle extending inwardly and upwardly within said washer, said baffle having a central opening, an inverted frustroconical deflector supported within and extending downwardly into the opening of said baffle, a plurality of inclined vanes attached along their inner extremities to said deflector and extending from said point of attachment radially outward, said vanes being attached along their outer extremities to the annular baffle, said vanes forming passageways for imparting rotatory motion to gas moving upwardly therethrough, and a clean gas outlet above said liquid separating means.

12. Dust collector apparatus including an upright elongated generally cylindrical washer, a tangential gas inlet for dust laden gas in the bottom portion of said washer, radially extending baffle means above said gas inlet, said baffle means including an annular baffle extending inwardly and downwardly from the inner wall of said washer and having a central opening, a centrally positioned imperforate deflector, vanes attached along their inner extremities to said centrally positioned deflector, said vanes extending from said point of attachment radially outwardly and attached along their outer extremities to said annular baffle, said vanes dividing the interior of said washer into a plurality of upwardly extending passageways, said vanes being inclined to the vertical so as to receive a rotating column of dust laden gas from the tangential inlet and maintain it in rotation, a sludge outlet below said gas inlet, an open-ended circuitous duct having its entrance and exit within said washer with the major portion of said duct being without said washer, the entrance of said duct being spaced above said radially extending baffle means and the exit of said duct being spaced above the duct's entrance, dynamic separation and impelling means in said duct comprising rapidly rotating means, spraying means for introducing liquid onto the surface of said rapidly rotating means, spraying means above the entrance of said duct for introducing liquid into said washer, a funnel-shaped collector beneath the spraying means in said washer for inwardly directing downwardly moving liquid, radially extending liquid separating means in said washer above the exit of said duct, and a clean gas outlet above said liquid separating means.

13. Dust collector apparatus including an upright elongated generally cylindrical washer, a tangential gas inlet for dust laden gas in the bottom portion of said washer, radially extending baffle means above said gas inlet, said baffle means including a plurality of inclined vanes forming passageways for imparting rotatory motion to gas introduced through said gas inlet, a sludge outlet below said gas inlet, an open-ended circuitous duct having its entrance and exit within said washer with the major portion of said duct being without said washer, the entrance of said duct being spaced above said radially extending baffle means and the exit of said duct being spaced above the duct's entrance, dynamic separation and impelling means consisting of a paddle wheel fan in said duct, spraying means for introducing liquid onto the surface of said paddle wheel fan, spraying means positioned at a spaced distance above the exit of said duct for introducing liquid into said washer, radially extending liquid separating means in said washer above the exit of said duct, and a clean gas outlet above said liquid separating means.

14. Duct collector apparatus including an upright elongated generally cylindrical washer, a tangential gas inlet for dust laden gas in the bottom portion of said washer, radially extending baffle means above said gas inlet, said baffle means including a plurality of inclined vanes forming passageways for imparting rotatory motion to gas introduced through said gas inlet, a sludge outlet below said gas inlet, an open-ended circuitous duct having its entrance and exit within said washer with the major portion of said duct being without said washer, the entrance of said duct being spaced above said radially extending baffle means and the exit of said duct being spaced above the duct's entrance, dynamic separation and impelling means in said duct consisting of a paddle wheel fan, spraying means for introducing liquid onto the surface of said paddle wheel fan, spraying means above the entrance of said duct for introducing liquid into said washer, radially extending liquid separating means in said washer above the exit of said duct, said means including an annular baffle extending inwardly and upwardly within said washer, said baffle having a central opening, an inverted frustroconical deflector supported within and extending downwardly into the opening of said baffle, a plurality of inclined vanes attached along their inner extremities to said deflector and extending from said point of attachment radially outward, said vanes being attached along their outer extremities to the annular baffle, said vanes forming passageways for imparting rotatory motion to gas moving upwardly therethrough, and a clean gas outlet above said liquid separating means.

15. Dust collector apparatus including an upright elongated generally cylindrical washer, a tangential gas inlet for dust laden gas in the bottom portion of said washer, radially extending baffle means above said gas inlet, said baffle means including an annular baffle extending inwardly and downwardly from the inner wall of said washer and having a central opening, a centrally positioned inperforate deflector, vanes attached along their inner extremities to said centrally positioned deflector, said vanes extending from said point of attachment radially outwardly and attached along their outer extremities to said annular baffle, said vanes dividing the interior of said washer into a plurality of upwardly extending passageways, said vanes being inclined to the vertical so as to receive a rotating column of dust laden gas from the tangential inlet and maintain it in rotation, a sludge outlet below said gas inlet, an open-ended circuitous duct having its entrance and exit within said washer with the major portion of said duct being without said washer, the entrance of said duct being spaced above said radially extending baffle means and the exit of said duct being spaced above the duct's entrance, dynamic separation and impelling means in said duct consisting of a paddle wheel fan, spraying means for introducing liquid onto the surface of said paddle wheel fan, spraying means above the entrance of said duct for introducing liquid into said washer, radially extending liquid separating means in said washer above the exit of said duct, and a clean gas outlet above said liquid separating means.

16. Dust collector apparatus including an upright elongated generally cylindrical washer, a tangential gas inlet for dust laden gas in the bottom portion of said washer, radially extending baffle means above said gas inlet, said baffle means including a plurality of inclined vanes forming passageways for imparting rotatory motion to gas introduced through said gas inlet, a sludge outlet below said gas inlet, an open-ended circuitous duct having its entrance and exit within said washer with the major portion of said duct being without said washer, the entrance of said duct being spaced above said radially extending baffle means and the exit of said duct being spaced above the duct's entrance, dynamic separation and impelling means in said duct comprising rapidly rotating means, spraying means for introducing liquid onto the surface of said rapidly rotating means, spraying means positioned at a spaced distance above the exit of said duct for introducing liquid into said washer, radially extending liquid separating means in said washer above the exit of said duct, said means including an annular baffle extending inwardly and upwardly within said washer, said baffle having a central opening, an inverted frustroconical deflector supported within and extending downwardly into the opening of said baffle, a plurality of inclined vanes attached along their inner extremities to said deflector and extending from said point of attachment radially outward, said vanes being attached along their outer extremities to the annular baffle, said vanes forming passageways for imparting rotatory motion to gas moving upwardly therethrough, and a clean gas outlet above said liquid separating means.

17. Dust collector apparatus including an upright elongated generally cylindrical washer, a tangential gas inlet for dust laden gas in the bottom portion of said washer, radially extending baffle means above said gas inlet, said baffle means including an annular baffle extending inwardly and downwardly from the inner wall of said washer and having a central opening, a centrally positioned imperforate deflector, vanes attached along their inner extremities to said centrally positioned deflector, said vanes extending from said point of attachment radially outward and attached along their outer extremities to said annular baffle, said vanes dividing the interior of said washer into a plurality of upwardly extending passageways, said vanes being inclined to the vertical so as to receive a rotating column of dust laden gas from the tangential inlet and maintain it in rotation, a sludge outlet below said gas inlet, an open-ended circuitous duct having its entrance and exit within said washer with the major portion of said duct being without said washer, the entrance of said duct being spaced above said radially extending baffle means and the exit of said duct being spaced above the duct's entrance, dynamic separation and impelling means in said duct comprising rapidly rotating means, spraying means for introducing liquid onto the surface of said rapidly rotating means, spraying means positioned at a spaced distance above the exit of said duct for introducing liquid into said washer, radially extending liquid separating means in said washer above the exit of said duct, and a clean gas outlet above said liquid separating means.

18. Dust collector apparatus including an upright elongated generally cylindrical washer, a tangential gas inlet for dust laden gas in the bottom portion of said washer, radially extending baffle means above said gas inlet, said baffle means including an annular baffle extending inwardly and downwardly from the inner wall of said washer and having a central opening, a centrally positioned imperforate deflector, vanes attached along their inner extremities to said centrally positioned deflector, said vanes extending from said point of attachment radially outwardly and attached along their outer extremities to said annular baffle, said vanes dividing the interior of said washer into a plurality of upwardly extending passageways, said vanes being inclined to the vertical so as to receive a rotating column of dust laden gas from the tangential inlet and maintain it in rotation, a sludge outlet below said gas inlet, an open-ended circuitous duct having its entrance and exit within said washer with the major portion of said duct being without said washer, the entrance of said duct being spaced above said radially extending baffle means and the exit of said duct being spaced above the duct's entrance, dynamic separation and impelling means in said duct comprising rapidly rotating means, spraying means for introducing liquid onto the surface of said rapidly rotating means, spraying means above the entrance of said duct for introducing liquid into said washer, radially extending liquid separating means in said washer above the exit of said duct, said means including an annular baffle extending inwardly and upwardly within said washer, said baffle having a central opening, an inverted frustroconical deflector supported within and extending downwardly into the opening of said baffle, a plurality of inclined vanes attached along their inner extremities to said deflector and extending from said point of attachment radially outward, said vanes being attached along their outer extremities to the annular baffle, said vanes forming passageways for imparting rotatory motion to gas moving upwardly therethrough, and a clean gas outlet above said liquid separating means.

19. A process for separating particles from a gas stream which includes the steps of contacting a rapidly moving rotating particle laden gas stream with recycled gas and recycled washing liquid containing suspended particles, agglomerating particles from said particle laden gas stream through contact with said recycled washing liquid, capturing said agglomerated particles in said recycled washing liquid, withdrawing a portion of said recycled washing liquid, diverting the mixture of gas, particles, and the remaining portion of said recycled washing liquid, contacting said diverted mixture with fresh washing liquid free from suspended particles to capture further particles from the gas, greatly increasing the velocity of said last-formed mixture, imparting a rotatory motion to said last-formed mixture, adding fresh washing liquid free from suspended particles to said rotating mixture to effect further capture of particles from the gas portion thereof, centrifugally removing liquid and particles from the gas portion of the last-mentioned mixture, separating a portion of said gas portion substantially free from entrained liquid and particles, and recycling a portion of the remaining gas, liquid, and particles to the first-mentioned rapidly moving rotating particle laden gas stream.

References Cited in the file of this patent

UNITED STATES PATENTS

| | | |
|---|---|---|
| 621,718 | Seymour | Mar. 21, 1899 |
| 1,037,095 | Williams et al. | Aug. 27, 1912 |
| 1,976,392 | Grilli | Oct. 9, 1934 |
| 2,195,707 | Nutting | Apr. 2, 1940 |
| 2,409,088 | Weits et al. | Oct. 8, 1946 |